United States Patent
Rippel et al.

(10) Patent No.: US 10,685,282 B2
(45) Date of Patent: Jun. 16, 2020

(54) MACHINE-LEARNING BASED VIDEO COMPRESSION

(71) Applicant: WaveOne Inc., Mountain View, CA (US)

(72) Inventors: Oren Rippel, Mountain View, CA (US); Sanjay Nair, Fremont, CA (US); Carissa Lew, San Jose, CA (US); Steve Branson, Woodside, CA (US); Alexander Anderson, Mountain View, CA (US); Lubomir Bourdev, Mountain View, CA (US)

(73) Assignee: WaveOne Inc., Mountain View, CA (US)

( * ) Notice: Subject to any disclaimer, the term of this patent is extended or adjusted under 35 U.S.C. 154(b) by 35 days.

(21) Appl. No.: 16/183,469

(22) Filed: Nov. 7, 2018

(65) Prior Publication Data

US 2020/0036995 A1    Jan. 30, 2020

Related U.S. Application Data

(60) Provisional application No. 62/703,361, filed on Jul. 25, 2018.

(51) Int. Cl.
| | |
|---|---|
| *G06N 5/02* | (2006.01) |
| *G06N 3/08* | (2006.01) |
| *H04N 19/182* | (2014.01) |
| *H04N 19/517* | (2014.01) |
| *G06K 9/00* | (2006.01) |
| *G06K 9/62* | (2006.01) |

(52) U.S. Cl.
CPC ............ *G06N 3/08* (2013.01); *G06K 9/00744* (2013.01); *G06K 9/6256* (2013.01); *H04N 19/182* (2014.11); *H04N 19/517* (2014.11)

(58) Field of Classification Search
CPC .... G06N 3/08; G06K 9/6256; G06K 9/00744; H04N 19/517; H04N 19/182
See application file for complete search history.

(56) References Cited

U.S. PATENT DOCUMENTS

| | | | |
|---|---|---|---|
| 10,504,005 B1* | 12/2019 | Walters | G06N 20/00 |
| 2013/0204664 A1* | 8/2013 | Romagnolo | G06Q 30/0203 705/7.32 |
| 2014/0068692 A1* | 3/2014 | Archibong | H04L 51/32 725/116 |
| 2017/0017886 A1* | 1/2017 | Gao | G06N 5/04 |

(Continued)

*Primary Examiner* — Howard D Brown, Jr.
(74) *Attorney, Agent, or Firm* — Fenwick & West LLP (57) ABSTRACT

An encoder system trains a compression model that includes an autoencoder model and a frame extractor model. The encoding portion of the autoencoder is coupled to receive a set of target frames and a previous state tensor for the set of target frames and generate compressed code. The decoding portion of the autoencoder is coupled to receive the compressed code and the previous state tensor for the set of frames and generate a next state tensor for the set of target frames. The frame extractor model is coupled to receive the next state tensor and generate a set of reconstructed frames that correspond to the set of target frames by performing one or more operations on the state tensor. The state tensor for the set of frames includes information from frames of the video that can be used by the frame extractor to generate reconstructed frames.

18 Claims, 6 Drawing Sheets

(56) References Cited

U.S. PATENT DOCUMENTS

| | | | |
|---|---|---|---|
| 2018/0139450 A1* | 5/2018 | Gao | H04N 19/147 |
| 2018/0227585 A1* | 8/2018 | Wang | H04N 19/119 |
| 2019/0095946 A1* | 3/2019 | Azout | G06Q 30/0277 |
| 2019/0124346 A1* | 4/2019 | Ren | H04N 19/503 |

* cited by examiner

MACHINE-LEARNING BASED VIDEO COMPRESSION

CROSS-REFERENCE TO RELATED APPLICATIONS

This application claims the benefit of provisional U.S. Application No. 62/703,361, filed on Jul. 25, 2018, which is incorporated by reference herein in its entirety.

BACKGROUND

This invention generally relates to encoding and decoding content, and more specifically to encoding and decoding content for videos.

Various online systems transmit information to and from one another over a network. The information may be in the form of images, videos that include a sequence of frames, or text. A sender typically encodes the information using an encoder system into a compressed form, and the compressed information is transmitted to the receiver. The receiver can then decode the compressed information using a decoder system to reconstruct the original information. A video typically includes a sequence of image frames that capture the motion of objects and background of a scene that occur due to movement of the camera or movement of the objects themselves. Compared to other types of information, video compression can be challenging due to large file size and issues such as video and audio synchronization. Video compression for lower-power devices, such as smartphones, can be even more challenging.

One way to encode each target frame in the sequence is to take advantage of redundant information in "reference frames." Reference frames for a target frame are frames in the video that are reconstructed before the target frame. In a process termed "P-frame compression," an encoder system identifies blocks of pixels in a reference frame. For each block in the reference frame, the encoder system determines the displacement of the block in the reference frame and a corresponding block in the target frame that contains the same portion of the scene. The displacement reflects the movement of the portion of the scene from the reference frame to the target frame. Typically, the displacements are represented in the form of motion vectors that indicate the direction and magnitude of the change from the reference frame to the target frame.

During the encoding process, the encoder system repeatedly determines motion vectors for a sequence of target frames in the video, each with respect to a reference frame that was reconstructed before the target frame. The encoder system generates a compensated frame by displacing the blocks of pixels in the reference frame based on the determined motion vectors. The compensated frame may resemble the target frame at a high-level, but may not include all of the details in the target frame. Thus, the encoder system also determines a residual frame that describes the difference between the target frame and the compensated frame. The encoder system compresses the motion vectors and the residual frame for each target frame for transmission to the receiver.

The decoder system at the receiver can repeatedly reconstruct each target frame by applying the motion vectors to a reconstructed reference frame to generate the compensated frame. The residual frame is combined with the compensated frame to generate the reconstructed frame. The reconstructed frame in turn can be used as the reference for the next frame in the video. By encoding the video frame using motion vectors and a residual frame, the encoder system may transmit a significantly smaller number of bits to the receiver compared to encoding the actual pixel data of the target frame from scratch.

However, P-frame compression can be difficult because representing the target frame in terms of motion vectors and residual frames alone may be too rigid and constraining. For example, some blocks may contain partial occlusions, in which two superimposed objects are each moving in different directions of motion. Determining the motion of the objects as a single motion vector for the block may be inappropriate, resulting in low reconstruction quality. As another example, while it may be advantageous to encode a frame using reference frames in the distant past, this is computationally infeasible in practice, and typically, reference frames temporally closest to the target frame are used to encode the frame. Moreover, while the relative amount of information spent on motion vectors and the residual frame remain relatively constant, it may be advantageous to adjust the relative amount between the two types of information depending on the content of the target frame.

SUMMARY

An encoder system trains a compression model to generate an encoder and decoder. For a sequence of one or more sets of target frames of a video, the compression model is coupled to receive a set of target frames in the sequence and a previous state tensor for the set of target frames, and generate a state tensor and a set of reconstructed frames for the set of target frames. The state tensor for the set of target frames is updated as the previous state tensor for the next set of target frames in the sequence. The state tensor for a set of target frames may include information on one or more frames of the video that can be used to generate the set of reconstructed frames. For example, the state tensor may include information on frames that were reconstructed immediately before the set of target frames or frames that were reconstructed multiple iterations before the set of target frames.

The compression model includes an autoencoder model and a frame extractor model. The autoencoder model includes an encoding portion and a decoding portion. The encoding portion is coupled to receive a set of target frames and a previous state tensor for the set of target frames and generate compressed code. The decoding portion is coupled to receive the compressed code and the previous state tensor for the set of frames and generate a next state tensor for the set of target frames. Thus, the compressed code represents information that can be used to update the previous state tensor to generate the next state tensor. The frame extractor model is coupled to receive the next state tensor and generate a set of reconstructed frames that correspond to the set of target frames by performing one or more operations on the state tensor. Thus, the state tensor for the set of frames includes information from one or more frames of the video that can be used by the frame extractor to generate the set of reconstructed frames. In one embodiment, the compression model also includes a state updater that is coupled to receive the next state tensor and update the next state tensor as the previous state tensor for the next set of target frames.

During the training process of the compression model, the encoder system obtains a set of training videos. Each training video may include a sequence of one or more training sets of frames that represent a scene over time. For each training video, the encoder system repeatedly performs a combination of a forward pass step and a backpropagation step for each training set of frames in the video. Specifically, during the forward pass step for a training set of frames, the encoder system applies the encoding portion to the training set of frames and a previous state tensor for the training set of frames to generate compressed code. The encoder system applies the decoding portion to the compressed code and the previous state tensor for the training set of frames to generate a next state tensor for the training set of frames. The encoder system applies the frame extractor model to the next state tensor to generate a set of reconstructed frames.

The encoder system determines a loss function based on the forward pass step. The loss function includes a reconstruction loss that indicates a difference between the training set of frames and the set of reconstructed frames. The loss function also includes a codelength regularization loss that indicates the code length of the compressed code for the training set of frames. During the backpropagation step, the encoder system updates the set of parameters for the encoding portion, the decoding portion, and the frame extractor model by backpropagating one or more error terms obtained from the loss function. The encoder system updates the next state tensor as the previous state tensor for the next training set of frames for the video using the state updater, and repeats the training process for the next training set of frames.

After the training process is completed, the encoder system stores a set of parameters of the encoding portion and the decoding portion as a set of parameters of an encoder. The encoder system also stores a set of parameters of the decoding portion and the frame extractor model as a set of parameters of a decoder, and provides the decoder to the decoder system.

In one embodiment, the frame extractor model includes multiple components that extract different types of information from the state tensor to reconstruct the target frames. Specifically, the frame extractor model includes a set of reference frame generator models, a set of motion flow generator models, a set of optical flow generator models, a weight map generator model, and a residual frame generator model that perform the one or more operations of the frame extractor.

The set of reference frame generator models are coupled to receive the state tensor and generate a set of sub-reference frames. Each sub-reference frame may include a subset of pixels in one or more frames of the video. The set of motion flow generator models are coupled to receive the state tensor and generate a set of motion flows. Each motion flow may contain information on how the subset of pixels in a corresponding sub-reference frame should be transformed to resemble a corresponding subset of pixels in the target frame. The set of optical flow generator models are coupled to receive the sub-reference frames and the motion flows for the sub-reference frames and generate a set of intermediate frames. The weight map generator model is coupled to receive the next state tensor and generate a weighted map that indicates how the intermediate frames should be combined to generate the set of reconstructed frames. The interpolator is coupled to receive each of the intermediate frames and apply the weighted map to the intermediate frames to generate a compensated frame. The residual generator model is coupled to receive the state tensor and generate a residual frame that can be combined with the compensated frame to generate the set of reconstructed frames.

During deployment, the encoder system sequentially encodes a sequence of one or more sets of target frames in a video by applying the encoding portion to a set of target frames and the previous state tensor for the set of target frames to generate compressed code. The compressed code is transmitted to the decoder system, and the next state tensor is updated as the previous state tensor for the next set of target frames in the sequence. The process is repeated until the last frame of the video. Responsive to receiving the transmitted code, the decoder system decodes the sequence of one or more sets of target frames in the video by applying the decoding portion to the previous state tensor for a set of target frames and the transmitted code to generate the next state tensor for the set of target frames. The decoder system applies the frame extractor model to the next state tensor to generate the set of reconstructed frames. The next state tensor is updated as the previous state tensor for the next set of target frames in the sequence. The process is repeated until the last frame of the video.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

Figure 1A:
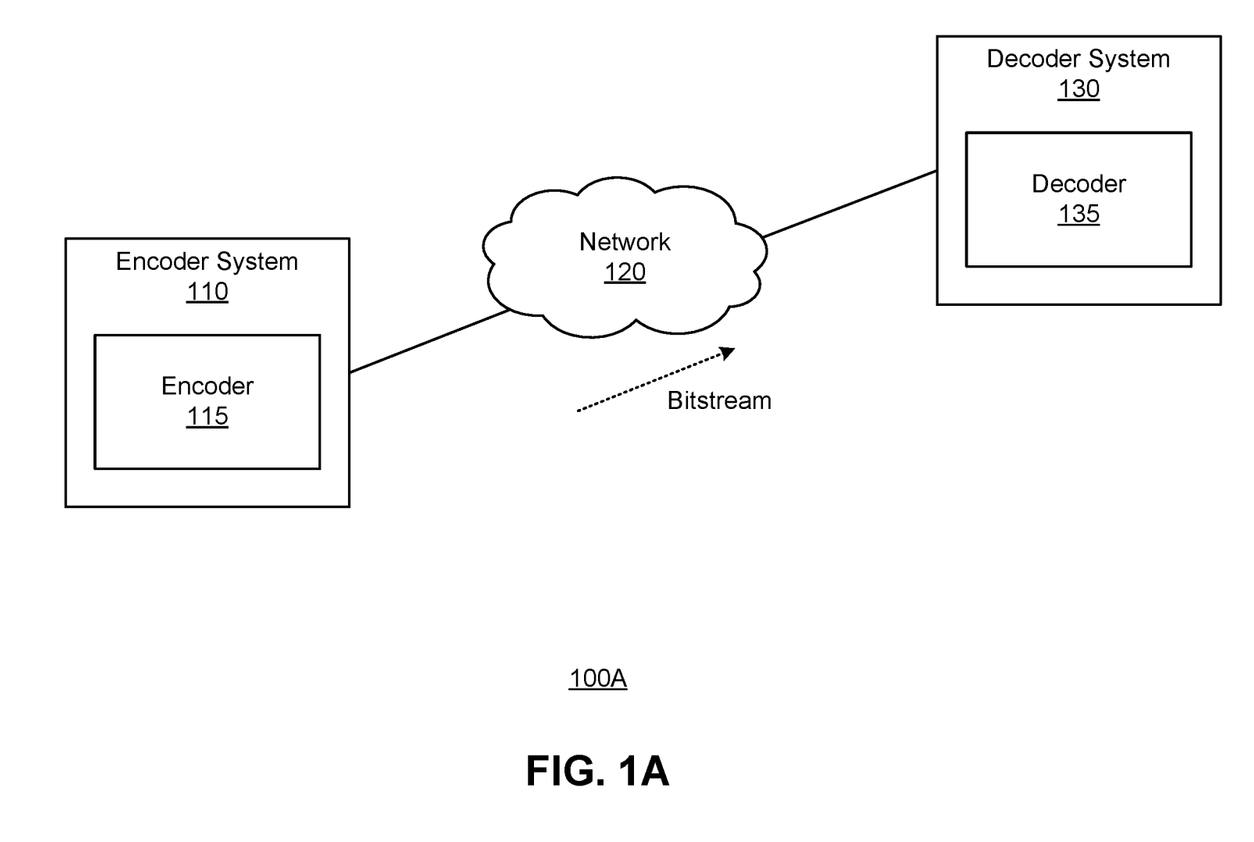
FIG. 1A is a block diagram of a system environment including an encoder system and a decoder system, in accordance with an embodiment.

FIG. 1A is a block diagram of a system environment 100A including an encoder system and a decoder system, in accordance with an embodiment. The system environment 100A shown in FIG. 1A comprises an encoder system 110, a decoder system 130, and a network 120. The encoder system 110 includes an encoder 115. The decoder system 130 includes a decoder 135. In alternative configurations, different and/or additional components may be included in the system environment 100.

The encoding system 110 encodes information, such as images, videos, and text, into a compressed form using an encoder 115. The encoding system 110 transmits the encoded information to the decoder system 130 that is typically in the form of a bitstream including a sequence of bits. The decoder system 130 can then decode the encoded information using a decoder 135 to reconstruct the original information.

In one particular embodiment referred throughout the specification, the information is a video that includes a sequence of frames. The sequence of frames are typically images of the same size, and capture motions that occur within a scene over time due to movement of the camera or the movement of the objects themselves. Specifically, motions are animated as the positions of pixels that correspond to a particular portion of the scene change throughout the sequence of frames. For example, the movement of a pedestrian walking in the left direction may be animated as the position of the pedestrian gradually shifts toward the left side of the frames. However, it is also appreciated that in other embodiments, the information can be a sequence of data other than videos, such as a sequence of texts.

In general, video frames, or other types of data derived from video frames may be represented as a tensor. As defined herein, a tensor denotes a multi-dimensional array of values having a width, height, and one or more channels across the depth of the tensor. Thus, a video frame in RGB color may be represented as a tensor with 3 channels, each channel including pixel intensity values for a particular color. As another example, a video frame in grayscale may be represented as a tensor with 1 channel representing pixel intensity values in grayscale. As used herein, a "position" of an element or pixel in a tensor denotes the position within the width and height of the tensor. Thus, an element at a particular position of a tensor may have a set of values associated with the element that corresponds to the number of channels of the tensor.

Figure 1B:
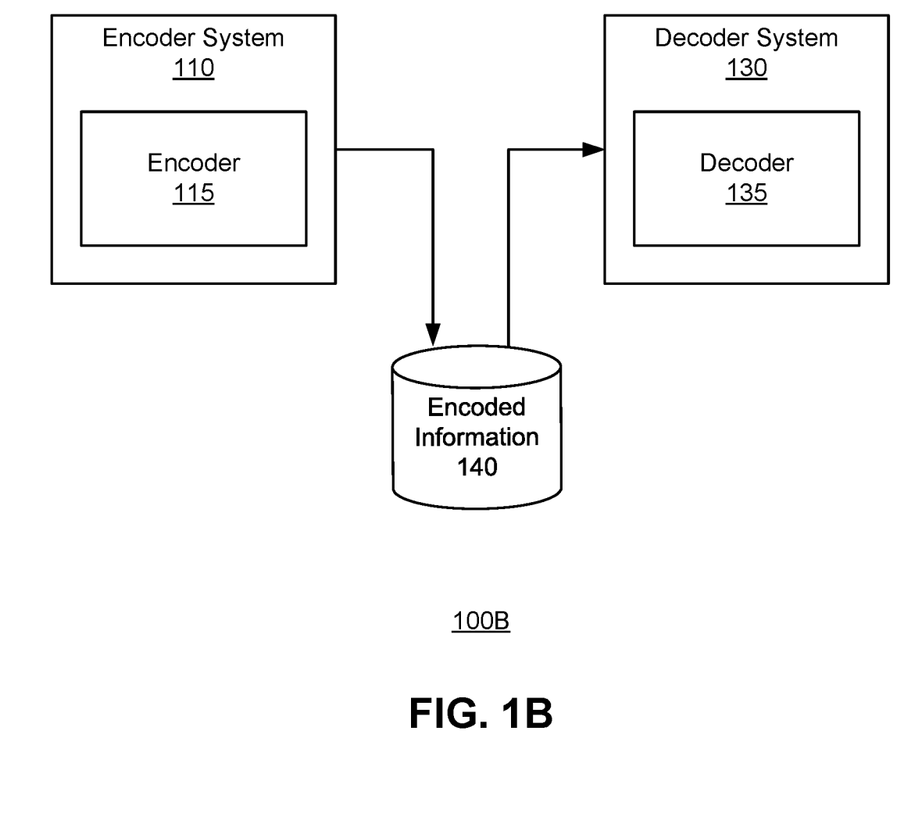
FIG. 1B is a block diagram of a system environment including an encoder system and a decoder system, in accordance with another embodiment.

FIG. 1B is a block diagram of a system environment 100B including an encoder system 110 and a decoder system 130, in accordance with another embodiment. The system environment 100B shown in FIG. 1B includes the encoder system 110, the decoder system 130, and additionally an encoded information data store 140 that can be used to store encoded information.

In the system environment 100B of FIG. 1B, the encoder system 110 encodes information and stores the encoded information in a data store 140. The decoder system 130 may retrieve the encoded information from the data store 140 to decode and reconstruct the original information. The data store 140 may represent electronic storage in the form of magnetic disks, optical disks, RAM disk, analog disks, non-volatile memory, volatile memory, and the like. The electronic storage may be a standalone storage device, or may be electronic storage integrated within a device, such as a computer or a camera. For example, responsive to a user recording a video, an encoder system 110 within the camera may encode the video and store the encoded video the memory of the camera. Responsive to a request to access the video, the decoder system 130 retrieves the encoded information from memory and decodes the video to present the video to the user.

In one embodiment, the encoder system 110 trains a compression model to generate the encoder 115 and decoder 135. For a sequence of one or more sets of target frames of a video, the compression model is coupled to receive a set of target frames in the sequence and a previous state tensor for the set of target frames, and generate a state tensor and a set of reconstructed frames for the set of target frames. The state tensor for the set of target frames are updated as the previous state tensor for the next set of target frames in the sequence. The state tensor for a set of target frames may include information on one or more frames of the video that can be used to generate the set of reconstructed frames. For example, the state tensor may include information on frames that were reconstructed immediately before the set of target frames or frames that were reconstructed multiple iterations before the set of target frames.

Training Process of Compression Model

Figure 2:
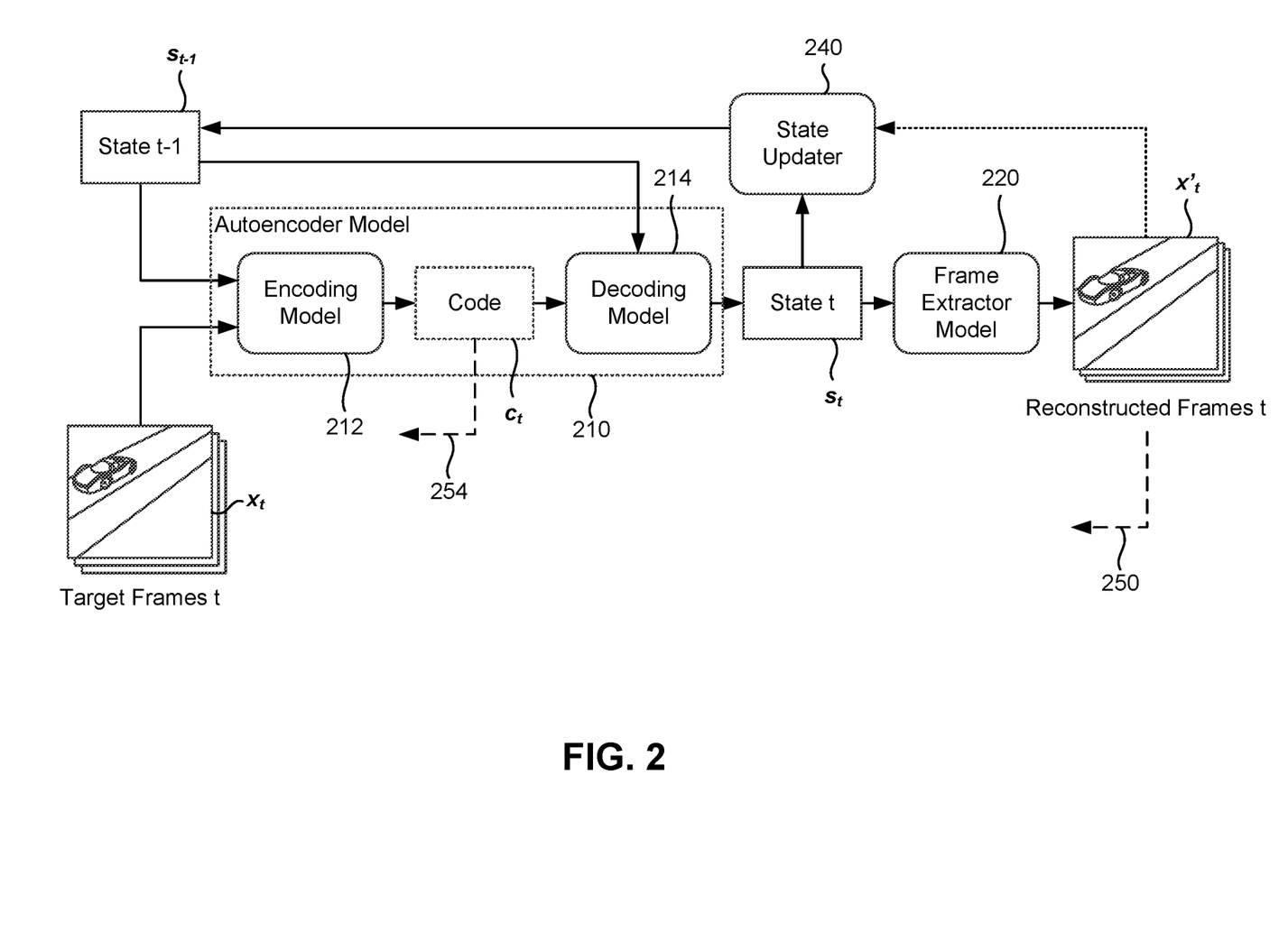
FIG. 2 illustrates a training process for the compression model, in accordance with an embodiment.

FIG. 2 illustrates a training process for the compression model, in accordance with an embodiment.

As shown in FIG. 2, the compression model includes an autoencoder model 210 and a frame extractor model 220. The autoencoder model 210 includes an encoding model 212 and a decoding model 214. The encoding model 212 is coupled to receive a set of target frames and a previous state tensor for the set of target frames and generate compressed code. The decoding model 214 is coupled to receive the compressed code and the previous state tensor for the set of frames and generate a next state tensor for the set of target frames. Thus, the compressed code represents information that can be used to update the previous state tensor to generate the next state tensor for the set of target frames. The frame extractor model 220 is coupled to receive the next state tensor and generate a set of reconstructed frames that correspond to the set of target frames by performing one or more operations on the state tensor. In one embodiment, the compression model also includes a state updater 240. The state updater 240 is coupled to receive the next state tensor and update the next state tensor as the previous state tensor for the next set of target frames.

The next state tensor includes information from one or more frames of the video including the set of target frames, and is used by the frame extractor model 220 to generate the set of reconstructed frames. Since the next state tensor for one set of target frames is repeatedly updated as the previous state tensor for the next set of target frames in the sequence, the state tensor generated for a set of target frames in the sequence may collectively include information on frames that were previously reconstructed by the compression model. The frames that were previously reconstructed may be frames that are temporally before or after the set of target frames in the video.

In one embodiment, the state tensor is a set of tensors that each include information on the one or more frames of the video at different spatial resolution and frequencies. In one instance, each element in the tensor may have a one-to-one correspondence with a pixel in a target frame. In another instance, each element of a tensor may have a correspondence with a group of pixels in the target frame in that the value of the element in the tensor is generated based on a combination of the values of the group of pixels in the target frame. For example, an element in the tensor may have a correspondence with a block of pixels in the target frame.

In one embodiment, the autoencoder model 210 and the frame extractor model 220 are each configured as one or more neural network models, such as artificial neural networks (ANN), convolutional neural networks (CNN), or deep neural networks (DNN). In one embodiment, the autoencoder model 210 may be configured as the autoencoders described in U.S. patent application Ser. No. 15/844,424, U.S. patent application Ser. No. 15/844,449, U.S. patent application Ser. No. 15/844,447, or U.S. patent application Ser. No. 15/844,452, all of which are incorporated by reference herein in their entirety.

Figure 3:
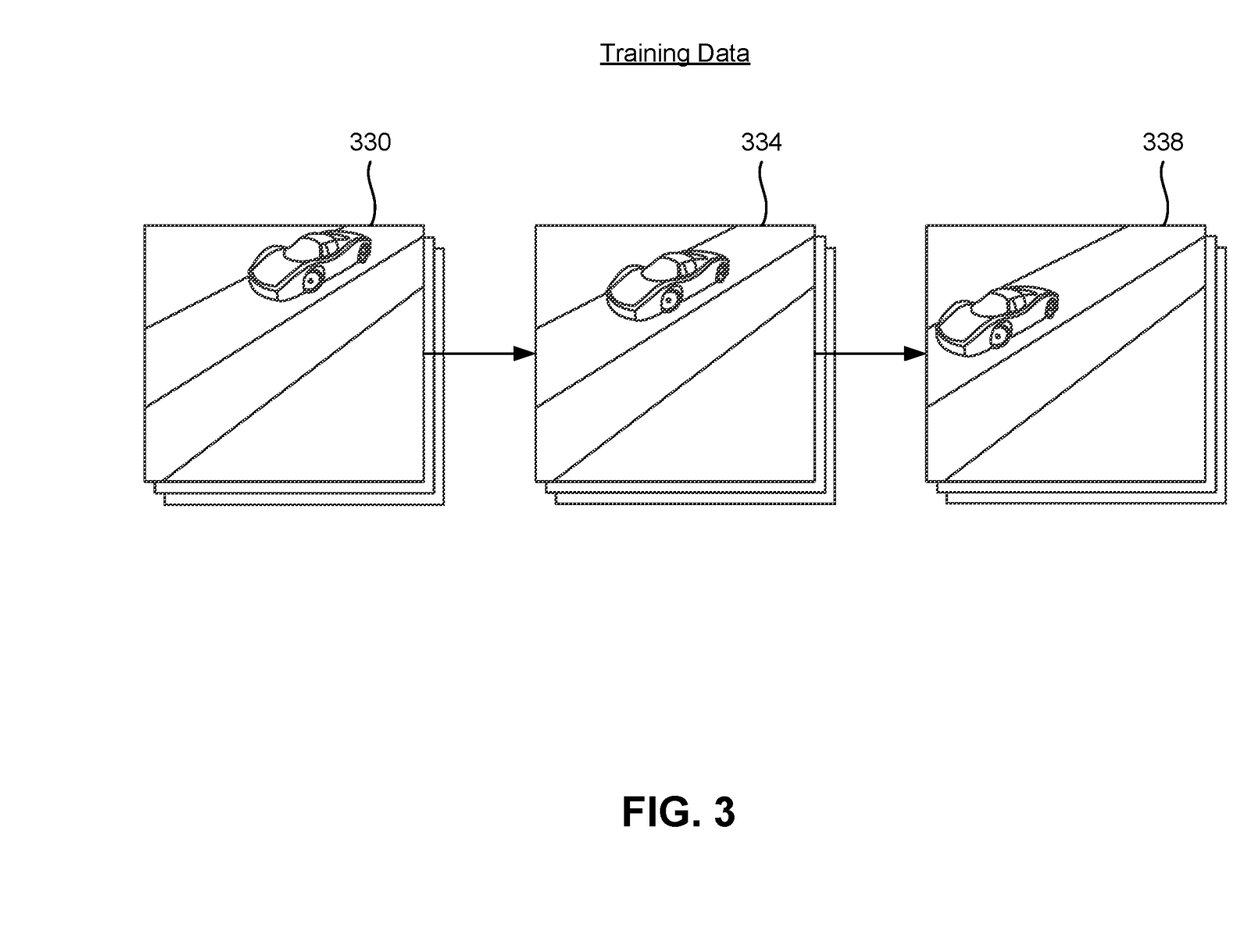
FIG. 3 illustrates a sequence of training sets of video frames obtained from a video, in accordance with an embodiment.

FIG. 3 illustrates a sequence of training sets of video frames obtained from a video, in accordance with an embodiment.

During the training process of the compression model, the encoder system 110 obtains a set of training videos. Each training video may include a sequence of one or more training sets of frames that represent a scene over time. As an example, the training video shown in FIG. 3 illustrates a car moving down a road. Each training set of frames include one or more frames from the training video. In the example shown in FIG. 3, the system 110 obtains a first training set of frames 330, a second training set of frames 334, and a third training set of frames 338 from the video that can be used to train the compression model.

Returning to FIG. 2, during the training process, the encoder system 110 repeatedly performs a combination of a forward pass step and a backpropagation step sequentially for each training set of frames in the video. Specifically, during the forward pass step for a training set of frames $x_t$ at the t-th iteration of the training process, the encoder system 110 applies the encoding model 212 to the training set of frames $x_t$ and a previous state tensor $s_{t-1}$ to generate compressed code $c_t$ for the training set of frames $x_t$. The encoder system 110 applies the decoding model 214 to the compressed code $c_t$ and the previous state tensor $s_{t-1}$ to generate a next state tensor $s_t$ for the training set of frames $x_t$. The encoder system 110 applies the frame extractor model 220 to the next state tensor $s_t$ to generate a set of reconstructed frames $x'_t$.

The encoder system 110 determines a loss function based on the results of the forward pass step. The loss function includes a reconstruction loss 250 that indicates a difference between the training set of frames $x_t$ and the set of reconstructed frames $x'_t$. In one embodiment, the reconstruction loss 250 is given by:

$$\mathcal{L}_r(x_t, x'_t; \theta_c) = \|x_t - x'_t\|^2$$

where $\theta_c$ indicates the collective set of parameters for the compression model, and $L_r$ indicates the reconstruction loss. The loss function also includes a codelength regularization loss 254 that indicates the code length of the compressed code $c_t$ for the training set of frames $x_t$. In one embodiment, the loss function is given by the combination of the reconstruction loss 250 and the codelength regularization loss 254.

During the backpropagation step, the encoder system 110 updates the set of parameters for the encoding model 212, the decoding model 214, and the frame extractor model 220 by backpropagating one or more error terms obtained from the loss function. The encoder system 110 updates the next state tensor $s_t$ as the previous state tensor for the next training set of frames $x_{t+1}$ for the video using the state updater 240, and repeats the training process for the next training set of frames $x_{t+1}$, until the last frame of the training video is reached. The encoding system repeats the training process for each training video in the set, and the training process is completed when the loss function satisfies a predetermined criteria. In one embodiment, the state updater 240 may merge the set of reconstructed frames $x'_t$ to the next state tensor $s_t$ when updating the previous state tensor for the next training set of frames.

In one embodiment, the training process of the compression model can be performed by "unrolling" the compression model through the sequence of one or more training sets of frames. In such an embodiment, the training process is performed as if multiple copies of the compression model are generated for the training sets of frames in the sequence. Specifically, each copy of the compression model is configured to receive a training set of frames and the previous state tensor for the frames, and output the next state tensor and the set of reconstructed frames for the training set of frames. The copy of the compression model is also configured to provide the next state tensor to the copy of the compression model for the next training set of frames in the sequence as its previous state tensor. The copies of the compression model each share the same set of parameters for the encoding model 212, the decoding model 214, the frame extractor model 220, and optionally the status updater 240.

During the forward pass step, the encoder system 110 applies a copy of the compression model to a corresponding training set of frames and the previous state tensor for the frames to generate the next state tensor and the set of reconstructed frames for the training set of frames. The next state tensor is passed by the status updater 240 as the previous state tensor for the next training set of frames in the sequence, and the encoding system 110 applies the copy of the compression model for the next training set of frames to generate the outputs for the next training set of frames. This process is repeated until the set of reconstructed frames for each training set of frames is generated for the training video. The encoder system 110 determines the loss function and the error terms for each copy of the compression model. During the backpropagation step, the encoder system 110 updates the set of parameters based on the error terms determined for the copies of the compression model.

By training the compression model using state tensors, the autoencoder model 210 is trained to propagate information in the state tensor that would be useful for reconstructing the set of target frames. Moreover, the autoencoder model 210 can retain information in the state tensor that is indefinitely propagated from previous state tensors, giving the state tensor a longer memory that can be advantageous for handling temporary occlusions in the video. Moreover, by training the autoencoder model 210 and the frame extractor model 220 as neural network models, this allows the models to leverage any redundancy between different types of information, and allow the models to adapt to each other and agree on what type of information to store in the state tensor.

The encoder system 110 stores the set of parameters of the encoding model 212 and the decoding model 214 as a set of parameters of the encoder 115. The encoder system 110 also stores a set of parameters of the decoding model 214 and the frame extractor model 220 as the set of parameters of the decoder 135, and provides the decoder 135 to the decoder system 130.

Architecture of Frame Extractor Model

Figure 4:
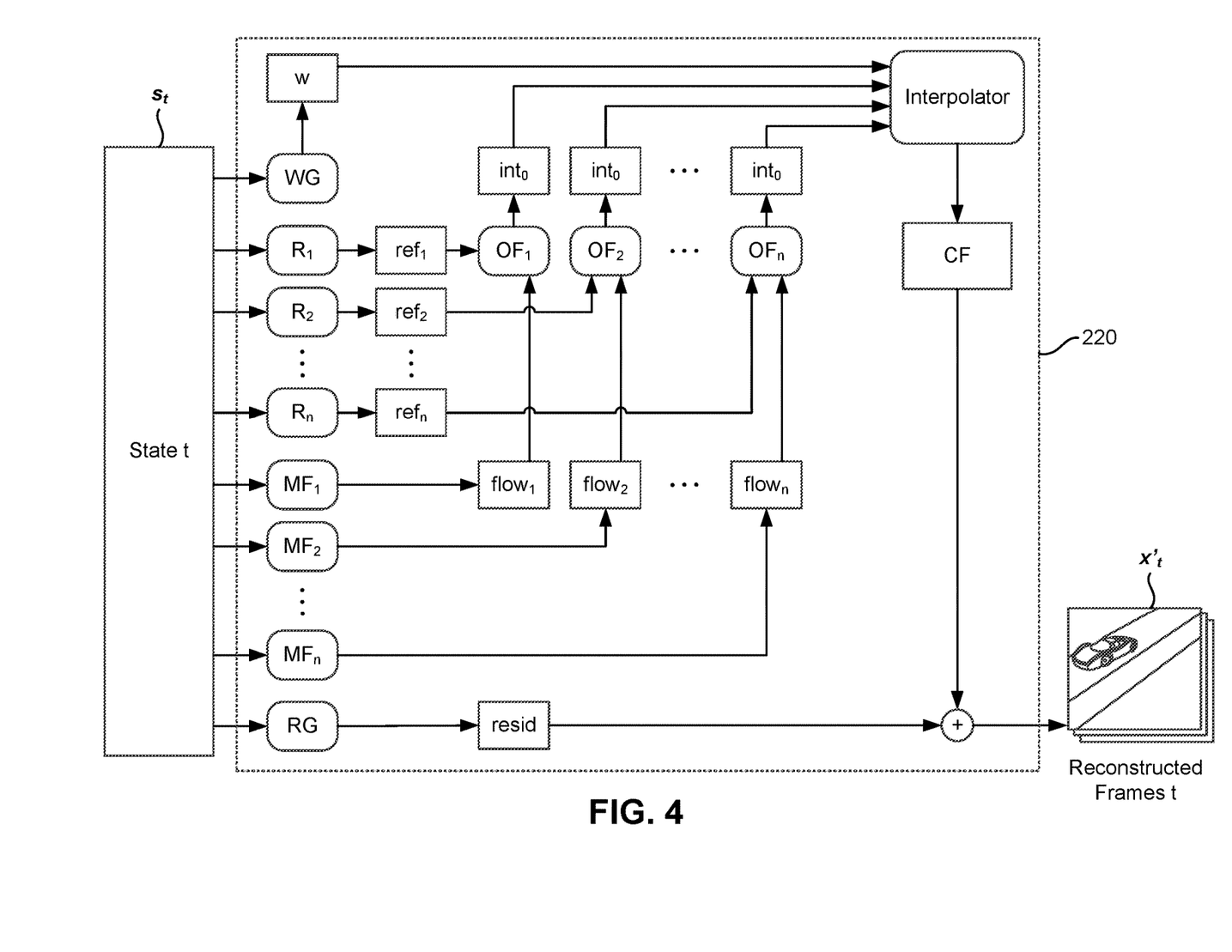
FIG. 4 illustrates an architecture of the frame extractor model, in accordance with an embodiment.

FIG. 4 illustrates an architecture of the frame extractor model, in accordance with an embodiment.

In one embodiment, the frame extractor model 220 includes multiple components that extract different types of information from the state tensor to reconstruct the set of target frames. Specifically, the frame extractor model 220 includes a set of reference frame generator models $R_1, R_2, \ldots, R_n$, a set of motion flow generator models $MF_1, MF_2, \ldots, MF_n$, a set of optical flow generator models $OF_1, OF_2, \ldots, OF_n$, a weight map generator model WG, and a residual frame generator model RG that perform the one or more operations of the frame extractor model 220. In general, the various components of the frame extractor model 220 may generate different types of intermediate frames at each step in the encoding process that can be combined or transformed to generate the set of reconstructed frames. In one embodiment, the set of reference frame generator models, the set of motion flow generator models, the set of optical flow generator models, the weight map generator model, and the residual generator model are each configured as a convolutional neural network (CNN).

The set of reference frame generator models $R_1, R_2, \ldots, R_n$ are coupled to receive the next state tensor and generate a set of sub-reference frames $ref_1, ref_2, \ldots, ref_n$. Each sub-reference frame may include a subset of pixels from one or more frames of the video. In one embodiment, the set of sub-reference frames may include information from frames that were reconstructed immediately before the set of target frames. Additionally, the set of sub-reference frames may include information from frames that were reconstructed multiple iterations before the set of target frames. In one instance, the sub-reference frames $ref_1, ref_2, \ldots, ref_n$ are each configured as color tensors.

The set of motion flow generator models $MF_1, MF_2, \ldots, MF_n$ are coupled to receive the state tensor and generate a set of motion flows $flow_1, flow_2, \ldots, flow_n$. Each motion flow may contain information on how the subset of pixels in a corresponding sub-reference frame should be transformed to resemble a corresponding subset of pixels in the target frame. The set of optical flow generator models $OF_1, OF_2, \ldots, OF_n$ are coupled to receive the sub-reference frames and the motion flows for the sub-reference frames and generate a set of intermediate frames $int_1, int_2, \ldots, int_n$. In one embodiment, the intermediate frames are each configured as color tensors.

In one embodiment, the transformations represented by the motion flows $flow_1, flow_2, \ldots, flow_n$ are displacements for the pixels in a corresponding sub-reference frame. In such an embodiment, the motion flows $flow_1, flow_2, \ldots, flow_n$ are configured as tensors having the same width and height as the sub-reference frames, and having two channels each representing a horizontal and vertical displacement of the pixels in the sub-reference frame. An intermediate frame may be generated by choosing pixels from the sub-reference frame according to the displacements indicated in the motion flow. For example, an element at a first position in a motion flow tensor may indicate the location in the sub-reference frame from where to copy the pixel into the first position of the intermediate frame. The motion flow location has a fractional component so the pixel to copy is interpolated from the pixels in the neighborhood of the specified location. Typical interpolation algorithms include bilinear or bicubic interpolation.

The weight map generator model WG is coupled to receive the next state tensor and generate a weighted map w that indicates how the intermediate frames $int_1, int_2, \ldots, int_n$ should be combined to generate the set of reconstructed frames. In one embodiment, the weighted map w is configured as a tensor having the same width and height as the intermediate frames, and having channels each representing a frame of interpolation coefficients. In one instance, the number of channels is one less the number of intermediate frames. Thus, an element at a particular position in the weighted map w includes a set of interpolation coefficients corresponding to the number of channels. The set of interpolation coefficients indicate how pixels at that particular position in each intermediate frame can be combined to generate the pixel at the particular position in a reconstructed frame.

The interpolator is coupled to receive each of the intermediate frames $int_1, int_2, \ldots, int_n$, and apply the weighted map w to the intermediate frames $int_1, int_2, \ldots, int_n$ to generate a compensated frame CF. For example, the interpolator may generate a weighted sum by weighting the elements at a particular position in each intermediate frame with a corresponding interpolation coefficient, and summing the results to generate the compensated frame CF. The residual generator model RG is coupled to receive the state tensor and generate a residual frame resid that can be combined with the compensated frame CF to generate the set of reconstructed frames. In one embodiment, the residual frame resid is also configured as a color tensor.

During a forward pass step of the training process, the encoder system 110 applies the set of reference generator models $R_1, R_2, \ldots, R_n$ to the next state tensor $s_t$ to generate the sub-reference frames for the training set of frames $x_t$. The encoding system 110 applies the set of motion flow generator models $MF_1, MF_2, \ldots, MF_n$ to generate the motion flows for the training set of frames $x_t$. The encoding system 110 also applies the weight map generator model WG to the next state tensor $s_t$ to generate the weight map w, and applies the residual generator model RG to the next state tensor $s_t$ to generate the residual frame for the training set of frames $x_t$. The encoding system 110 applies the set of optical flow generator models $OF_1, OF_2, \ldots, OF_n$ to the sub-reference frames and motion flows of the training set of frames $x_t$ to generate the set of intermediate frames for the training set of frames $x_t$. The intermediate frames and the weight map are combined by the interpolator to generate the compensated frame. The compensated frame and the residual frame are combined to generate the set of reconstructed frames $x'_t$.

During the backpropagation step, after the loss function has been determined, the encoder system 110 updates the set of parameters for the reference frame generator models, the motion flow generator models, the optical flow generator models, the weight map generator model, and the residual generator model by backpropagating one or more error terms obtained from the loss function. Since the parameters of the frame extractor model may only affect the reconstruction loss, the set of parameters of the frame extractor model may be updated only based on error terms obtained from the reconstruction loss.

As shown in FIG. 4, by training the compression model using state tensors, the autoencoder model 210 can propagate different types of information in the form of, for example, sub-reference frames, motion flows, and residual frames. The frame extractor model 220 can learn to identify and combine these different types of information to generate the reconstructed frames. Moreover, the amount of resources that are spent for each type of information can be adjusted by jointly training the components of the frame extractor model 220 as neural network models.

The architecture shown in FIG. 4 may also allow the frame extractor model 220 to process different motion fields in parallel, resulting in a more compact way of handling video scenes with interleaved motions. For example, the sub-reference frames and their corresponding motion flows may each identify segments of pixels that move in a similar manner from the reference frame to the target frame. For example, a first sub-reference frame may identify a segment of pixels for a car moving in the left direction, and a second sub-reference frame for the same scene may identify a segment of pixels for a ball moving in the right direction. These two motions within the same scene can be represented more compactly using two types of motion flows, in which the motion flow for the first sub-reference frame contains left displacement vectors, and the motion flow for the second sub-reference frame contains right displacement vectors. After the motion flows are applied to the sub-reference frames to generate the two intermediate frames, the interpolator can simply select which one to use for each pixel.

In one embodiment, the frame extractor model 220 is configured as a cascaded architecture, in which various components of the frame extractor model are iteratively and repeatedly applied to any intermediate frames that are output by the frame extractor model 220 to generate the set of reconstructed frames. For example, in FIG. 4, rather than determining the combination of the compensated frame CF and the residual frame resid as the set of reconstructed frames, the combination can be treated as an intermediate frame, and the frame extractor model 220 may include an additional set of residual frame generator models, motion flow generator models, optical flow generator models, or residual frame generator models that can be applied to the intermediate frame in a cascaded manner to improve the quality of reconstruction.

For example, the frame extractor model 220 shown in FIG. 4 can additionally include a residual frame generator coupled to receive the next state tensor and generate an additional residual frame, and a motion flow generator coupled to receive the next state tensor and generate an additional motion flow. In an example cascaded architecture, an optical flow generator can be applied to a first intermediate frame that is the combination of the compensated frame CF and the residual frame resid and the additional motion flow to generate a second intermediate frame that is a motion compensated frame. The second intermediate frame can then be combined with the additional residual frame to generate the set of reconstructed frames.

By using a cascaded architecture, the encoder system 110 can improve the quality of reconstruction especially when the content of the reconstruction is difficult. For example, although it may be challenging to produce high-quality reconstruction frames for some types of video content, encoding the video through multiple iterations using the cascaded architecture allows refinement of the reconstruction quality as a function of the previous updates that have been applied.

Deployment Process of Encoder and Decoder

Figure 5:
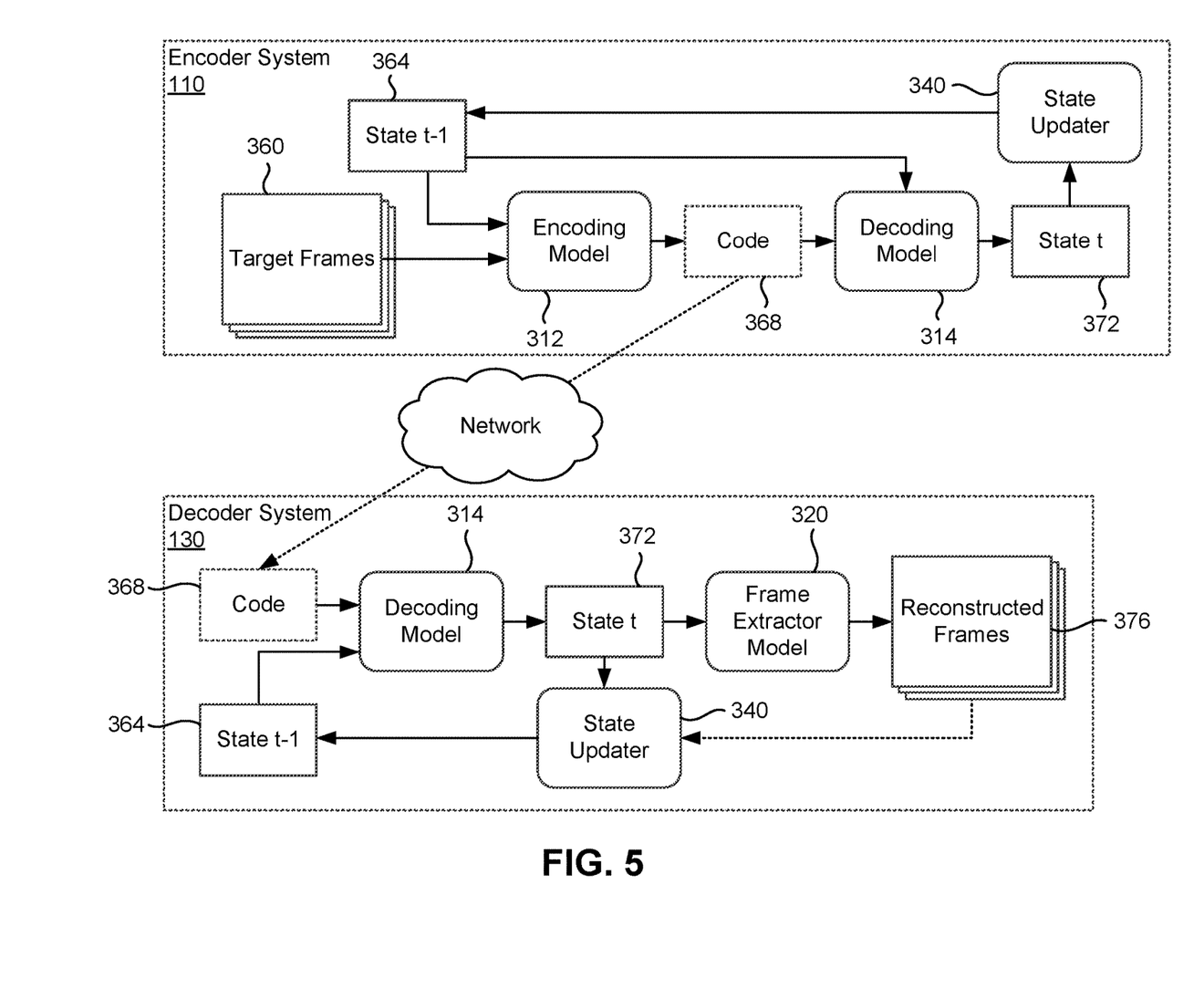
FIG. 5 illustrates a deployment process of the encoder and the decoder, in accordance with an embodiment.

FIG. 5 illustrates a deployment process of the encoder 115 and the decoder 135, in accordance with an embodiment.

During deployment, the encoder system sequentially encodes a sequence of one or more sets of target frames in a video using an encoder 115 that includes a trained encoding model 312 and decoding model 314. Specifically, FIG. 5 illustrates an encoding process for the t-th set of target frames in the video. The encoder system 110 applies the encoding model 312 to a set of target frames 360 and the previous state tensor 364 to generate compressed code 368 for the target frames 360. The encoder system 100 applies the decoding model 314 to the compressed code 368 to generate the next state tensor 372 for the set of target frames. The compressed code 368 is transmitted to the decoder system 130, and the next state tensor 372 is updated as the previous state tensor for the next set of target frames in the sequence. The process is repeated until the last frame of the video.

In one embodiment, the encoder 110 optionally includes the frame extractor model 320 that can be applied to generate the set of reconstructed frames 376, and the state updater 340 optionally merges the set of reconstructed frames 376 with the next state tensor 372 to update the previous state tensor for the next set of frames.

Responsive to receiving the transmitted code, the decoder system 130 decodes the sequence of one or more sets of target frames in the video by using a decoder 135 that includes the trained decoding model 314 and frame extractor model 320. Specifically, FIG. 5 illustrates a decoding process for the t-th set of target frames in the video. The decoder system 130 applies the decoding model 314 to the transmitted code 368 and the previous state tensor 364 to generate the next state tensor 372 for the set of target frames. The decoder system 130 applies the frame extractor model 320 to the next state tensor 372 to generate the set of reconstructed frames 376. The next state tensor 372 is updated as the previous state tensor for the next set of target frames in the sequence. In one embodiment, the state updater 340 optionally merges the next state tensor 372 and the set of reconstructed frames 376 to update the previous state tensor for the next set of frames. The process is repeated until the last frame of the video.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An encoder stored on a computer readable storage medium, wherein the encoder is manufactured by a process comprising:
    obtaining a set of training videos, each training video including a sequence of one or more training sets of frames representing a scene over time;
    accessing a compression model including:
        an autoencoder portion including an encoding portion and a decoding portion, the encoding portion coupled to receive a set of target frames and a previous state tensor for the set of target frames, and generate compressed code, and the decoding portion coupled to receive the compressed code and the previous state tensor and generate a next state tensor for the set of target frames, and
        a frame extractor portion coupled to receive the next state tensor and generate a set of reconstructed frames;
    for each training video, sequentially performing, for each training set of frames in the training video:
        performing a forward pass step to generate a set of reconstructed frames for the training set of frames, the performing comprising:
            generating a compressed code for the training set of frames by applying the encoding portion to the training set of frames and a previous state tensor for the training set of frames,
            generating a next state tensor for the training set of frames by applying the decoding portion to the compressed code and the previous state tensor for the training set of frames, and
            generating the set of reconstructed frames by applying the frame extractor portion to the training set of frames;
        determining a loss function, the loss function including:
            a reconstruction loss indicating a difference between the training set of frames and the set of reconstructed frames, and
            a codelength regularization loss indicating an expected code length of the compressed code for the training set of frames;
        updating a set of parameters for the encoding portion, the decoding portion, and the frame extractor portion by backpropagating one or more error terms obtained from the loss function; and
        updating the next state tensor for the training set of frames as the previous state tensor for the next training set of frames in the sequence;
    storing the set of parameters of the encoding portion and the decoding portion as a set of parameters of the encoder.

2. The encoder of claim 1, wherein the frame extractor portion further includes:
    a set of reference frame generator portions, each reference frame generator portion coupled to receive the next state tensor and generate a sub-reference frame;
    a set of motion flow generator portions, each motion flow generator portion coupled to receive the next state tensor and generate a motion flow;
    a set of optical flow generator portions, each optical flow generator coupled to receive a corresponding sub-reference frame and a corresponding motion flow and generate an intermediate frame by applying the motion flow to pixels of the sub-reference frame; and
    a residual frame generator coupled to receive the next state tensor and generate a residual frame that can be combined with the intermediate frames to generate the set of reconstructed frames.

3. The encoder of claim 2, wherein each motion flow is configured as a tensor including a first channel and a second channel, and wherein values of the motion flow at the first channel indicate horizontal displacements of pixels in a corresponding sub-reference frame, and values of the motion flow at the second channel indicate vertical displacements of pixels in the corresponding sub-reference frame.

4. The encoder of claim 2, wherein the sub-reference frames and the intermediate frames are each configured as a tensor including one or more color channels.

5. The encoder of claim 2, wherein the frame extractor portion further includes:
    a weight map generator model coupled to receive the next state tensor and generate a weighted map, the weighted map including a set of interpolation coefficients for each element; and
    an interpolator coupled to receive the intermediate frames and the weighted map and generate a compensated frame by applying the weighted map to the intermediate frames.

6. The encoder of claim 5, wherein the residual frame is combined with the compensated frame to generate a first intermediate frame, and wherein the frame extractor portion further includes:
    a motion flow generator portion coupled to receive the next state tensor and generate an additional motion flow;
    an optical flow generator portion configured to receive the additional motion flow and the first intermediate frame and generate a second intermediate frame; and
    a residual frame generator coupled to receive the next state tensor and generate an additional residual frame that can be combined with the second intermediate frame to generate the set of reconstructed frames.

7. The encoder of claim 1, wherein the set of target frames include two or more target frames from a video.

8. The encoder of claim 1, wherein updating the next state tensor further comprises merging the next state tensor with the set of reconstructed frames to generate a merged tensor, and updating the merged tensor as the previous state tensor for the next training set of frames.

9. The encoder of claim 1, wherein the frame extractor portion is configured as a convolutional neural network model.

10. A decoder stored on a computer readable storage medium, wherein the decoder is manufactured by a process comprising:
    obtaining a set of training videos, each training video including a sequence of one or more training sets of frames representing a scene over time, and;
    accessing a compression model including:
        an autoencoder portion including an encoding portion and a decoding portion, the encoding portion coupled to receive a set of target frames and a previous state tensor for the set of target frames, and generate compressed code, and the decoding portion coupled to receive the compressed code and the previous state tensor and generate a next state tensor for the set of target frames, and
        a frame extractor portion coupled to receive the next state tensor and generate a set of reconstructed frames;

for each training video, sequentially performing, for each training set of frames in the training video:
 performing a forward pass step to generate a set of reconstructed frames for the training set of frames, the performing comprising:
  generating a compressed code for the training set of frames by applying the encoding portion to the training set of frames and a previous state tensor for the training set of frames,
  generating a next state tensor for the training set of frames by applying the decoding portion to the compressed code and the previous state tensor for the training set of frames, and
  generating the set of reconstructed frames by applying the frame extractor portion to the training set of frames;
 determining a loss function, the loss function including:
  a reconstruction loss indicating a difference between the training set of frames and the set of reconstructed frames, and
  a codelength regularization loss indicating a code length of the compressed code for the training set of frames;
 updating a set of parameters for the encoding portion, the decoding portion, and the frame extractor portion by backpropagating one or more error terms obtained from the loss function; and
 updating the next state tensor for the training set of frames as the previous state tensor for the next training set of frames in the sequence;
storing the set of parameters of the decoding portion and the frame extractor portion as a set of parameters of the decoder.

11. The decoder of claim 10, wherein the frame extractor portion further includes:
 a set of reference frame generator portions, each reference frame generator portion coupled to receive the next state tensor and generate a sub-reference frame;
 a set of motion flow generator portions, each motion flow generator portion coupled to receive the next state tensor and generate a motion flow; and
 a set of optical flow generator portions, each optical flow generator coupled to receive a corresponding sub-reference frame and a corresponding motion flow and generate an intermediate frame by applying the motion flow to pixels of the sub-reference frame; and
 a residual frame generator coupled to receive the next state tensor and generate a residual frame that can be combined with the intermediate frames to generate the set of reconstructed frames.

12. The decoder of claim 11, wherein each motion flow is configured as a tensor including a first channel and a second channel, and wherein values of the motion flow at the first channel indicate horizontal displacements of pixels in a corresponding sub-reference frame, and values of the motion flow at the second channel indicate vertical displacements of pixels in the corresponding sub-reference frame.

13. The decoder of claim 11, wherein the sub-reference frames and the intermediate frames are each configured as a tensor including one or more color channels.

14. The decoder of claim 11, wherein the frame extractor portion further includes:
 a weight map generator model coupled to receive the next state tensor and generate a weighted map, the weighted map including a set of interpolation coefficients for each element; and
 an interpolator coupled to receive the intermediate frames and the weighted map and generate a compensated frame by applying the weighted map to the intermediate frames.

15. The decoder of claim 14, wherein the residual frame is combined with the compensated frame to generate a first intermediate frame, and wherein the frame extractor portion further includes:
 a motion flow generator portion coupled to receive the next state tensor and generate an additional motion flow;
 an optical flow generator portion configured to receive the additional motion flow and the first intermediate frame and generate a second intermediate frame; and
 a residual frame generator coupled to receive the next state tensor and generate an additional residual frame that can be combined with the second intermediate frame to generate the set of reconstructed frames.

16. The decoder of claim 10, wherein the set of target frames include two or more target frames from a video.

17. The decoder of claim 10, wherein updating the next state tensor further comprises merging the next state tensor with the set of reconstructed frames to generate a merged tensor, and updating the merged tensor as the previous state tensor for the next training set of frames.

18. The decoder of claim 10, wherein the frame extractor portion is configured as a convolutional neural network model.

* * * * *